United States Patent [19]
Edwards et al.

[11] Patent Number: 5,833,388
[45] Date of Patent: Nov. 10, 1998

[54] METHOD FOR DIRECTING GROUNDWATER FLOW AND TREATING GROUNDWATER IN SITU

[75] Inventors: David A. Edwards, Rochester; Vincent B. Dick, Honeoye Falls, both of N.Y.

[73] Assignee: Haley and Aldrich, Inc., Cambridge, Mass.

[21] Appl. No.: 681,701

[22] Filed: Jul. 29, 1996

[51] Int. Cl.$^6$ ............................... B09B 3/00; E02D 3/11
[52] U.S. Cl. ........................... 405/52; 210/170; 210/747; 405/128
[58] Field of Search ............................... 405/128, 50, 52, 405/36; 210/747, 170

[56] References Cited

U.S. PATENT DOCUMENTS

| | | |
|---|---|---|
| 5,266,213 | 11/1993 | Gillham . |
| 5,416,257 | 5/1995 | Peters .................................. 405/128 X |
| 5,456,550 | 10/1995 | Devlin ..................................... 405/128 |
| 5,626,437 | 5/1997 | Hunt et al. .............................. 405/128 |

FOREIGN PATENT DOCUMENTS 8-19828/92   5/1995   Australia .

OTHER PUBLICATIONS

Begor, "Creation of an Artificially Produced Fracture Zone to Prevent Contaminated Ground–Water Migration," *Ground Water*, 27(1):57–65 (Jan.–Feb. 1989).

Smith et al., "Linear Blasting for Migration Control in Low Permeability Rock Formations." *Proceedings of the Hazardous Materials Control Resources Institute/Federal Environmental Resources III* (Apr. 1994).

Starr et al., "In Situ Remediation of Contaminated Ground Water: The Funnel–and–Gate System," *Ground Water*, 32(3):465–476 (May–Jun. 1994).

Gehl, "Controlled Blasting and Variable–Rate Pumping for Effective Ground Water Capture in Fractured Bedrock," *Preceedings of the Focus Conference on Eastern Regional Ground Water Issues* (Oct. 3–5, 1994), pp. 265–273.

McKown et al., "Blast Trenches for Groundwater Remediation," *Proceedings of the 21st Annual Conference on Explosives and Blasting Techniques, International Society of Exposives Engineers* (1995).

"Innovative Technology", in *New York State Department of Environmental Conservation Remediation Review*, 8(1):6–7 (Spring/Summer 1995).

"Building a Wall Against Toxic Waste", *Geotimes*, p. 13 (Oct. 1995).

"Reactions in Subsurface Wall Destroy Groundwater Contaminants In Situ," *Ground Water Monitor*, p. 178 (Nov. 2, 1995).

*Primary Examiner*—Dennis L. Taylor
*Attorney, Agent, or Firm*—Nixon, Hargrave, Devans & Doyle LLP

[57] ABSTRACT

The present invention relates to a method for treating groundwater in situ in rock or soil. An elongate permeable upgradient zone and an elongate permeable downgradient zone, each in hydraulic communication with a permeable subsurface treatment zone and having a major axis parallel to a non-zero component of the general flow direction, are provided in the subsurface by any of a number of construction methods. The upgradient zone, downgradient zone, and treatment zone are situated within the subsurface medium and have permeabilities substantially greater than the adjacent subsurface medium's permeability. Groundwater is allowed to move from the subsurface medium adjacent to the upgradient zone into the upgradient zone, where the groundwater refracts and moves to a treatment zone. After being treated in the treatment zone by an in situ treatment process, such as a process employing air sparging, sorption or reaction with zero-valent iron, the groundwater moves into, through, and out of the downgradient zone into the subsurface medium adjacent to the downgradient zone. The method does not require pumping. A method for directing groundwater around a particular location to prevent contamination of the groundwater by a contaminant located at the particular location, to prevent migration of a contaminant located at the particular location, to reduce the flow velocity of groundwater in the particular location, or to increase the residence time in an in situ treatment center located downgradient from the particular location is also disclosed.

27 Claims, 8 Drawing Sheets

METHOD FOR DIRECTING GROUNDWATER FLOW AND TREATING GROUNDWATER IN SITU

FIELD OF THE INVENTION

This invention relates to a method for directing the flow of groundwater and to a method for treating groundwater.

BACKGROUND OF THE INVENTION

Most efforts to address groundwater contamination in subsurface media have historically involved pumping to extract contaminated groundwater from the subsurface for above-ground treatment. This process is commonly referred to as "pump-and-treat". However, pump-and-treat systems are limited in their ability to remediate contaminated groundwater, soil, and rock (Mackay et al., *Environmental Science and Technology*, 23(6):630–636 (1989) and Travis et al., *Environmental Science and Technology*, 24:1464–1466 (1990)). Remedial lifetimes are commonly on the order of decades to centuries. During pumping, there are ongoing energy and cost requirements, and the need to properly treat the groundwater for disposal at the surface poses an additional problem.

Conventional pump-and-treat systems are particularly ineffective for collecting and treating groundwater from low-permeability fractured rock. Contaminated groundwater in low-permeability fractured rock is commonly extracted for treatment at the surface by actively pumping from one or more conventional vertical recovery wells, typically installed at or near the contaminant source for source remediation and at the downgradient end of a contaminant plume to control contaminant migration.

Conventional migration control in low-permeability fractured rock typically requires installation of a sufficient number of recovery wells to capture all of the contaminated groundwater that would otherwise pass by. However, when the fractures in the low-permeability rock are irregularly spaced and poorly interconnected, as they commonly are, large numbers of conventional vertical recovery wells must be placed fairly close together to ensure that most of the contaminated groundwater is captured. Sometimes, the range of potential groundwater capture in low-permeability fractured rock for a single well may be only ten to thirty feet, especially under unconfined conditions, and attempting to achieve effective capture over a wide region may require several dozen wells equipped with pumps and piping, all of which must be installed and maintained at considerable expense. Moreover, in cold climates, the associated surface lines and other equipment must be protected from freezing which further adds to the expense. Even with close well installation, some large fractures or faults may pass unnoticed between wells and allow significant migration of contaminants past the area of pumping In recent years, unconventional horizontal wells, rather than conventional vertical wells, have sometimes been used for groundwater recovery, but, in general, these also require active pumping to extract contaminated groundwater, and they are very expensive to construct. Moreover, horizontal wells frequently fail to capture contaminated groundwater in low-permeability fractured rock, because the presence of certain extremely low-permeability horizontal rock layers prevents groundwater from flowing at an appreciable rate in the vertical direction, except through widely-spaced isolated fractures. Under the hydraulic stress of pumping, there might be negligible or very small vertical components of flow through these low-permeability layers to the horizontal-well screens, precluding effective groundwater recovery from horizontal rock layers that are separated from the well screen by the low-permeability layers.

A comparatively new method for recovering groundwater from low-permeability fractured rock involves pumping groundwater from a linear blasted-bedrock zone or from a radial set of blasted-bedrock zones (Begor et al., *Ground Water*, 27:57–65 (1990); Smith et al., *Proceedings of the 5th Annual Hazardous Materials and Environmental Management Conference/Central, Chicago*, pp. 103–117 (1992); Gehl, *Proceedings of the Focus Conference of Eastern Regional Groundwater Issues*, National Water Well Association, pp. 265–273 (1994); and McKown et al., *Proceedings of the 21st Annual Conference on Explosives and Blasting Techniques*, International Society of Explosives Engineers, pp. 305–322 (1995) ("McKown")). The linear zones of shattered rock, commonly referred to as "trenches", along with one or more pumping wells, can form an extraction system that effectively connects otherwise naturally unconnected fractures and greatly increases the effective region of pumping influence. Since a blasted-bedrock trench has a much greater hydraulic conductivity than the native rock surrounding it, groundwater flows in from many directions when the pump in a trench recovery well is operating. The average flow rate from one or more recovery wells installed in a blasted-bedrock trench exceeds the hypothetical flow rate of more than 60 or 70 traditional recovery wells installed in the same type of rock (McKown). However, as indicated above, flow into the trench is effected only when the trench is actively pumped.

One common characteristic of the groundwater "pump-and-treat" methods, irrespective of whether the well employed is a horizontal well, a vertical well, or a blasted-bedrock well, is the need to bring the groundwater collected by the well to the surface for treatment. Generally, this requires more or less continuous pump operation, and this pumping process, as well as the surface treatment processes, is expensive in terms of operational and maintenance costs. In addition, effluent from the above-ground treatment of groundwater typically must be discharged to a permitted discharge point or to a publicly owned wastewater treatment facility. Since the treated groundwater is discharged above ground, chemical substances other than the contaminants which necessitated the groundwater treatment must also be dealt with in the treatment process and be remediated to levels acceptable for above-ground discharge. For example, when Fe(II) in anaerobic groundwater is brought to the surface and exposed to air, it commonly is oxidized to Fe(III) which then forms a precipitate, which can cause water-quality problems and foul treatment equipment and lines. Another example of this problem is the need to permit colloidal materials and silt to settle out the groundwater prior to treatment and/or discharge. Thus, above-ground treatment frequently necessitates the installation of systems to treat substances which would never have needed remediation had the water remained in the subsurface. The long-term costs of above-ground effluent treatment and disposal, coupled with the long-term costs associated with the maintenance and operation of pumps and related equipment, makes above-ground treatment of groundwater expensive.

Therefore, a continuing need exists for methods of directing groundwater flow and treating groundwater. The present invention is directed to meeting this need.

SUMMARY OF THE INVENTION

The present invention relates to a method for treating groundwater flowing in a general flow direction through a subsurface medium. The method includes providing an elongate permeable upgradient zone and an elongate permeable downgradient zone. The upgradient zone is located hydraulically upgradient from and in hydraulic communication with a treatment zone and has a major axis parallel to a non-zero component of the general flow direction. The downgradient zone is located hydraulically downgradient from and in hydraulic communication with the treatment zone and has a major axis parallel to a non-zero component of the general flow direction. Each of the upgradient zone, downgradient zone, and treatment zone is situated within the subsurface medium and has a permeability substantially greater than the surrounding subsurface medium's permeability. Groundwater is allowed to move from the subsurface medium surrounding the upgradient zone into and through the upgradient zone to, through, and out of the treatment zone. The groundwater is then allowed to move into, through, and out of the downgradient zone into the subsurface medium surrounding the downgradient zone. The method further includes treating the groundwater in the treatment zone.

The present invention also relates to a method for directing groundwater flowing in a general flow direction through a subsurface medium around a particular subsurface location. The method includes providing an elongate permeable upgradient zone and an elongate permeable downgradient zone. The upgradient zone is located hydraulically upgradient from the particular location and has a major axis parallel to a non-zero component of the general flow direction. The downgradient zone is located hydraulically downgradient from and in hydraulic communication with the upgradient zone, is located downgradient from the particular location, and has a major axis parallel to a non-zero component of the general flow direction. Each of the upgradient zone and downgradient zone is situated within the subsurface medium and has a permeability substantially greater than the surrounding subsurface medium's permeability. The method further includes allowing groundwater to move from the subsurface medium surrounding the upgradient zone into and through the upgradient zone to, through, and out of the downgradient zone into the subsurface medium surrounding the downgradient zone.

The method of the present invention is particularly well suited for directing contaminated groundwater without pumping to one or more subsurface treatment zones in rock or soil where the groundwater can be treated in situ. Because the method permits in situ groundwater treatment, no pumping is required, and the costs associated with pumping are avoided. Moreover, the problems associated with discharging effluent from above-ground groundwater treatment are avoided. The method of the present invention can also be used to direct relatively uncontaminated groundwater around a relatively contaminated subsurface location to prevent contamination of the relatively uncontaminated groundwater. Alternatively, the method of the present invention can be used to protect a relatively uncontaminated subsurface location from becoming contaminated by a contaminated groundwater flow by directing the relatively contaminated groundwater around the relatively uncontaminated subsurface location.

DETAILED DESCRIPTION OF THE INVENTION

The present invention relates to a method for treating groundwater. Groundwater includes water located below the surface of the ground at gauge pressures greater than zero atmospheres. The groundwater is located in a subsurface medium. The subsurface medium can be any naturally occurring or man-made medium, including, for example, soil, rock, and fill. The subsurface medium can include a single type of material, or it can include two or more types of materials. Moreover, the subsurface medium can have a substantially uniform permeability or can vary in permeability.

Prior to the installation of the upgradient, downgradient, and treatment zones (described below), the groundwater flows through the subsurface medium along streamlines affected by local permeability variations in the subsurface medium. Macroscopically, the groundwater has a general flow direction, which is the weighted average of the microscopic flows along all the streamlines in a particular spatial region of the subsurface medium. It is not critical to the practice of method of the present invention that the precise flow direction be known, although such knowledge would facilitate optimization of the method for a particular spatial region. The general flow directions can be determined by well-known techniques, such as those described in Freeze et al., *Groundwater*, Englewood Cliffs, N.J.:Prentice-Hall, Inc. (1979) and Domenico et al., *Physical and Chemical Hydrogeoloqy*, New York:John Wiley and Sons (1990) ("Domenico"), which are hereby incorporated by reference.

The method includes providing an upgradient zone and a downgradient zone situated in the subsurface medium in which the groundwater to be treated is located. The upgradient zone is hydraulically upgradient from and in hydraulic communication with a permeable treatment zone which is also situated within the subsurface medium. The downgradient zone is hydraulically downgradient from and in hydraulic communication with the treatment zone. That is, water in the upgradient zone will, over the course of time, flow from the upgradient zone to and through the treatment zone and from the treatment zone to the downgradient zone.

Each of the upgradient zone, the downgradient zone, and the treatment zone has a permeability (i.e., an inherent capacity to transmit fluid) substantially greater than the permeability of the subsurface medium. In particular, it is preferred that each of these zones has a permeability substantially greater than the permeability of the subsurface medium surrounding the zone. To provide a margin of safety to account for unknown permeability variations in the subsurface medium, it is most preferred that the permeabilities of the upgradient, downgradient, and treatment zones all be substantially greater than the permeability of the most permeable portion of the subsurface medium. The absolute values of the permeabilities of the upgradient, downgradient, and treatment zones are not critical to the practice of the present invention. The important factor is that the upgradient, downgradient, and treatment zones, permeabilities be substantially greater than that of the subsurface medium. For a relatively low-permeability substrate medium, such as some types of rock or soil, very large permeability contrasts between the upgradient, downgradient, and treatment zones, collectively, and the subsurface medium can be readily attained.

The upgradient, downgradient, and treatment zones can be constructed of permeable materials, such as porous or fractured media, whose permeability is enhanced well above the permeability of the surrounding rock, soil, or other subsurface medium, through an engineered process. Suitable porous media include those materials containing open spaces between grains, pebbles, or blocks of the solid portion of the media. More particularly, porous media suitable for use as permeable materials in the practice of the present invention include, but are not limited to, consolidated materials, such as broken or fractured rock, and unconsolidated materials, such as sand, or gravel.

The compositions and permeabilities of the materials in the upgradient, downgradient, and treatment zones can be the same or different. Generally, for ease of construction, these materials are the same, and, consequently, their permeablilities are also similar. However, in some cases, such as where the geometry of the upgradient and downgradient zones are different or where the permeabilities of the subsurface medium surrounding the upgradient and downgradient zones differ, upgradient and downgradient zones made of materials having different permeabilities may be desirable.

The permeability of the permeable materials in the upgradient, downgradient, and treatment zones are, preferably, at least two to three orders of magnitude greater than the permeability of the subsurface medium surrounding the upgradient, downgradient, and treatment zones. For example, in the case where the subsurface medium has a hydraulic conductivity on the order of $10^{-4}$ cm/s, permeable materials suitable for use in the construction of the upgradient, downgradient, and treatment zones are those having hydraulic conductivities of from about $10^{-3}$ cm/s to about $10^{-1}$ cm/s, preferably from about $10^{-2}$ cm/s to about $10^{-1}$ cm/s; where the subsurface medium has a hydraulic conductivity on the order of $10^{-5}$ cm/s, suitable permeable materials are those having hydraulic conductivities of from about $10^{-4}$ cm/s to about $10^{-1}$ cm/s, preferably from about $10^{-3}$ cm/s to about $10^{-1}$ cm/s; where the subsurface medium has a hydraulic conductivity on the order of $10^{-6}$ cm/s, suitable permeable materials are those having hydraulic conductivities of from about $10^{-5}$ cm/s to about $10^{-1}$ cm/s, preferably from about $10^{-4}$ cm/s to about $10^{-1}$ cm/s. In addition, it should be noted that the upgradient zone need not necessarily be of uniform permeability or composition, although substantial uniformity is generally preferred. Likewise, the downgradient and treatment zones may each be of uniform or nonuniform permeability and composition.

Figure 1:
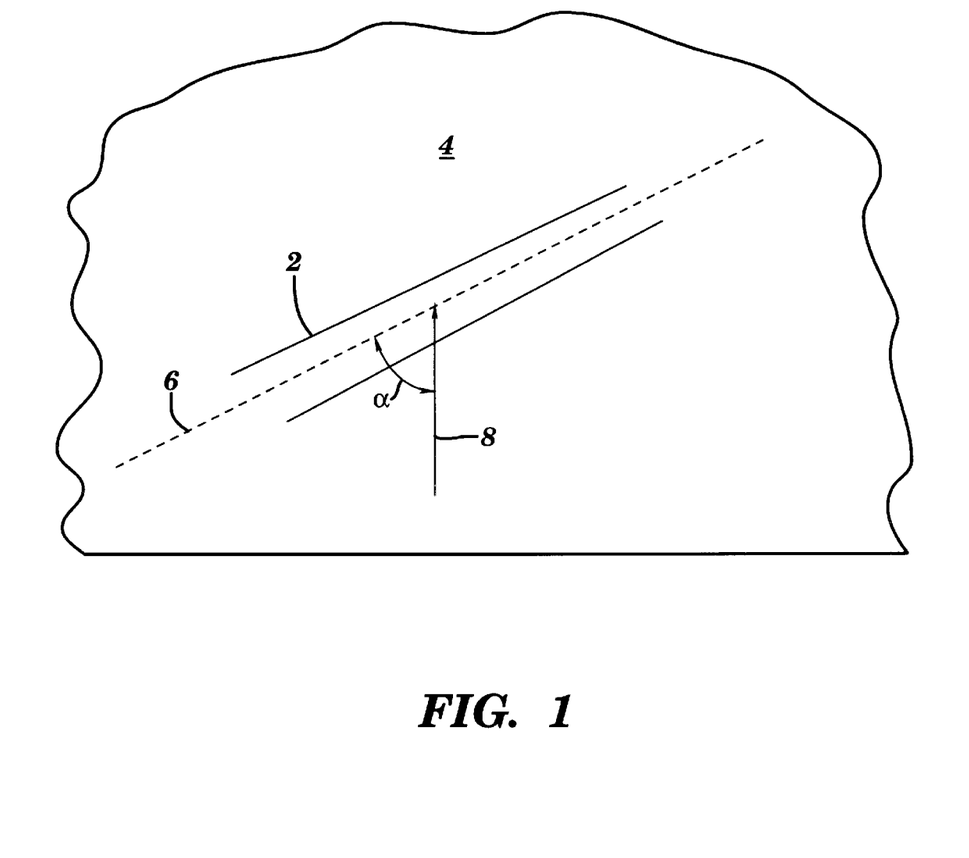
FIG. 1 is a plan view of a subsurface medium containing an upgradient zone.

The upgradient zone is elongate along a major axis parallel to a non-zero component of the general groundwater flow direction, that is, in a direction which is not perpendicular to the general groundwater flow. One suitable orientation of the upgradient zone with respect to the general flow direction of the groundwater is depicted in FIG. 1.

Upgradient zone 2, situated in substrate medium 4, is elongate along major axis 6. Major axis 6 and the groundwater's general flow direction 8 form an angle, designated $\alpha$. The angle $\alpha$ can have any value from 0° to up to slightly less than 90°. Preferred orientations of the elongate upgradient zone with respect to the subsurface groundwater flow are those where angle a is from about 30° to about 60°. Optimal orientations depend on a variety of factors, such as the permeability of the upgradient zone, the permeability of the subsurface medium, particularly the permeability of the subsurface medium surrounding the upgradient zone, and the shape of the upgradient zone. Optimization of these variables is discussed in greater detail below.

The downgradient zone is also elongate along a major axis parallel to a non-zero component of the groundwater's general flow direction, that is, in a direction which is not perpendicular to the general groundwater flow.

The elongate upgradient zone and downgradient zone can have any aspect ratio greater than 1. Suitable aspect ratios are, generally, much greater that one, usually from about 10 to about 100. Optimal aspect ratios are dictated by a number of factors, including orientation of the zones with respect to each other and to the groundwater's general flow direction, permeability of the upgradient and downgradient zones, and permeability of the subsurface medium. The upgradient and downgradient zones can be of any elongate shape when viewed in a plane paralleling the surface of the ground, including, for example, elliptical, rectangular, or triangular. Preferred shapes are those which are substantially rectangular, although non-uniform permeabilities along the length of the upgradient zone or the downgradient zone may cause other shapes to be favored. Preferably, the upgradient and downgradient zones are of substantially uniform width over a substantial portion of their lengths. Typically and especially in cases where the permeabilities of the subsurface media surrounding the upgradient and downgradient zones are substantially the same and where the permeabilities of the upgradient and downgradient zones are substantially the same, it is preferred that the upgradient and downgradient zones be of the same shape, more preferably rectangular, each having the same, substantially uniform width and substantially the same length.

Figure 2A:
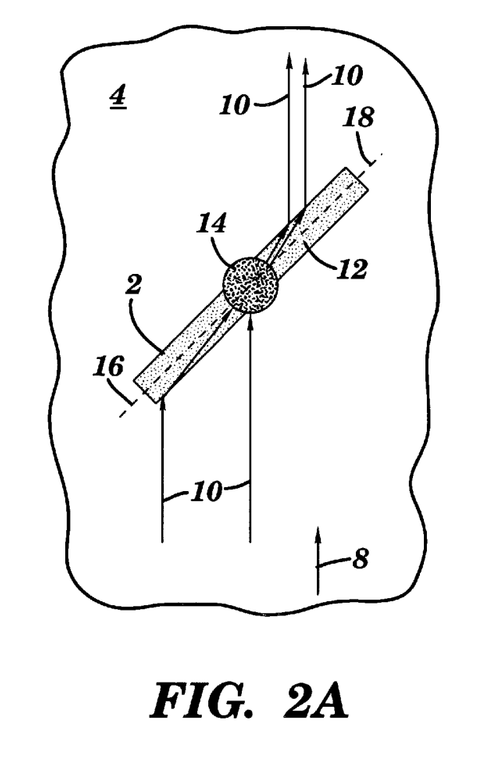
FIGS. 2A–2F are plan views of various upgradient and downgradient zone configurations in accordance with the present invention.
Figure 2B:
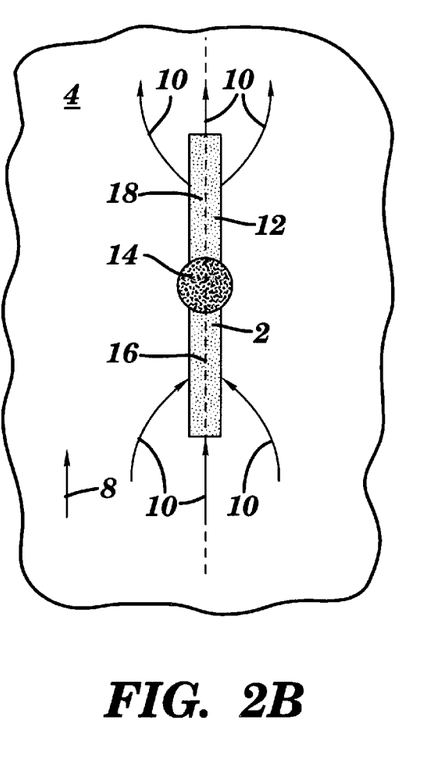
Figure 2C:
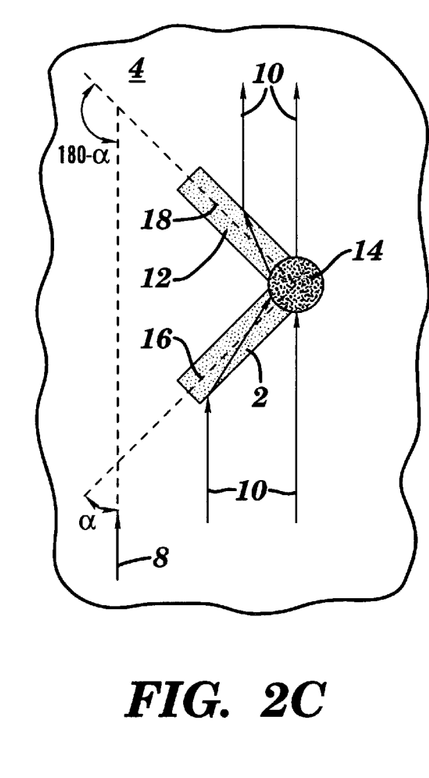

The upgradient and downgradient zones can be oriented in a number of spatial configurations in the practice of the present invention. Several suitable orientations are shown in FIGS. 2A, 2B, and 2C. Flowlines 10 show the path groundwater having general flow direction 8 takes through subsurface medium 4 under the influence of upgradient zone 2, downgradient zone 12, and treatment zone 14 when upgradient zone 2 is elongate along major axis 16 and downgradient zone 12 is elongate along major axis 18. In one suitable orientation, depicted in FIG. 2A, the major axes of the upgradient and downgradient zones are coincident, and the upgradient and downgradient zones form a line oriented in any direction other than perpendicular to the general flow direction of the groundwater. In one particular illustration of this orientation, depicted in FIG. 2B and designated the "I-shape", the upgradient and downgradient zones' major axes are coincident with each other and parallel to the groundwater's general flow direction. Another advantageous shape is that of a "sideways-V", such as depicted in FIG. 2C. The sideways-V has an apex at the treatment zone and legs, representing the upgradient and downgradient zones, pointing away from a line parallel to the general flow direction. As indicated before, the upgradient zone's major axis forms an angle, $\alpha$, with the flow direction. In the sideways-V orientation, the downgradient zone is preferably elongated along an axis which forms an angle equal to 180-α, as indicated in FIG. 2C. When configured in this way, the angle between the major axes of the upgradient and downgradient zones is 180-2α.

As indicated above, the upgradient and downgradient zones are in hydraulic communication with the treatment zone. For purposes of this application, two zones have the quality of being "in hydraulic communication" when the zones abut one another or are separated by some intervening material which does not significantly reduce the movement of fluid from one zone to the other. Preferably, the intervening material has a permeability at least equal to the permeability of one of the two zones in hydraulic communication. However, intervening materials of somewhat lower permeability can be acceptable.

Having provided the upgradient and downgradient zones, groundwater is allowed to enter the upgradient zone and move through the upgradient zone to the treatment zone. The groundwater is then allowed to move from the treatment zone to the downgradient zone, through the downgradient zone, and out of the downgradient zone into the subsurface medium surrounding the downgradient zone. Groundwater movement into, through, and out of the upgradient, downgradient, and treatment zones occurs without pumping, governed by the forces created by the existence of the upgradient, downgradient, and treatment zones of higher permeability than the permeability of the subsurface medium. Subsurface groundwater flowing in a general flow direction contacts the subsurface medium-upgradient zone interface and moves into the zone. Subsurface groundwater water within the upgradient zone then moves under hydraulic forces within and through the upgradient zone for some distance in a direction semi-parallel to the upgradient zone's major axis to and into the treatment zone. The water then is directed by hydraulic forces out of the treatment zone, into the downgradient zone, through at least a portion of the downgradient zone, and out of the downgradient zone into the subsurface medium surrounding the downgradient zone. Optimally, the shape and orientation of the upgradient and downgradient zones are such that the rate of movement of groundwater out of the downgradient zone is the same as the rate of movement of subsurface groundwater into the upgradient zone, thereby avoiding hydraulic head buildup within the upgradient and downgradient zones.

Figure 2D:
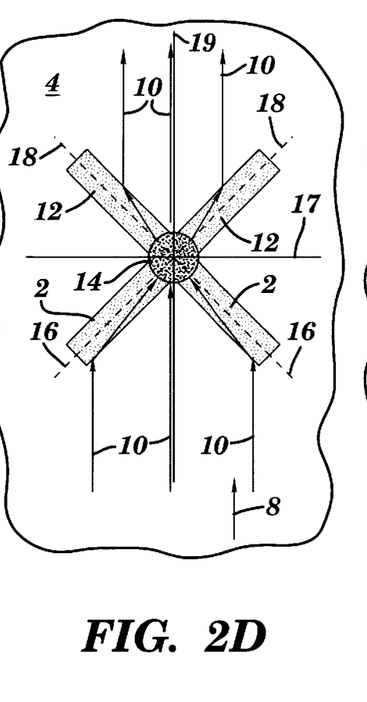

The method of the present invention can also be practiced using a plurality of upgradient and downgradient zones. In this embodiment the method further includes providing one or more additional elongate upgradient zones and one or more additional elongate downgradient zones. Each additional upgradient and downgradient zone has a permeability which is substantially greater that the permeability of the subsurface medium, and each has a major axis parallel to a non-zero component of the flow direction. Preferably, the number of additional of upgradient zones is equal to the number of additional downgradient zones so that the total number of upgradient zones is equal to the total number of downgradient zones. In a particularly preferred embodiment, each downgradient zone is elongate along a major axis which is coincident with the major axis of one of the upgradient zones, so that each downgradient zone has exactly one corresponding upgradient zone along whose major axis it is elongate. The orientation of the additional upgradient and downgradient zones is not critical to the practice of the present invention. However, it is preferred that the downgradient zone and the additional downgradient zones be mirror images of the upgradient zone and the additional upgradient zones reflected in a plane perpendicular to general flow direction and passing through the treatment zone such as plane 17, as illustrated in cross section in FIG. 2D. Optimally, the total number of upgradient zones is 2, and the total number of downgradient zones is 2. In this configuration the upgradient and downgradient zones form two sideways V's having a common apex, the apex representing the treatment zone to which groundwater is directed. This configuration, designated the X-configuration because of the shape defined by the two upgradient and two downgradient zones when viewed in a plane parallel to the surface of the ground, is depicted in FIG. 2D. As indicated before, the preferred configuration of each sideways V making up the X is such that the angle between the general flow direction and the downgradient zone's major axis is 180-α, where α is the angle between the upgradient zone's major axis and the general flow direction. In a more preferred configuration, the downgradient zone and the additional downgradient zone are mirror images of the upgradient zone and the additional upgradient zone reflected in a plane perpendicular to the ground surface, parallel to the general flow direction, and passing through the treatment zone such as plane 19, as illustrated in cross section in FIG. 2D.

Figure 2E:
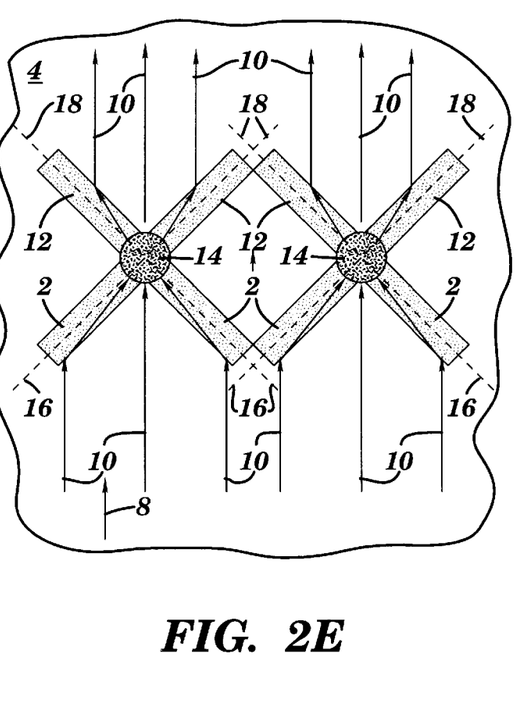
Figure 2F:
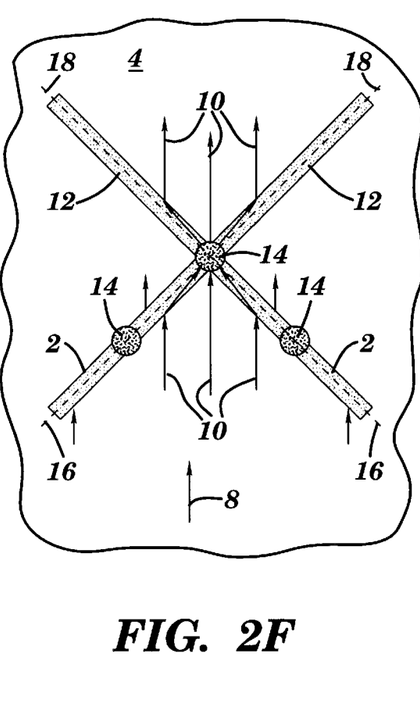

As the skilled artworker will note, additional configurations are possible including, for example, multiple, laterally adjacent configurations. The method of the present invention can be used to direct groundwater to a series of treatment zones by employing a series of paired upgradient and downgradient zones with each pair of zones hydraulically connected to a single treatment zone. One example of such a configuration is a series of laterally adjacent sideways V's where each V in the series points in the same direction. Another example of such a configuration is a series of laterally adjacent X's, as illustrated in FIG. 2E. Using multiple treatment zones, a broader area of groundwater flow can be directed to the series of treatment zones for treatment. Other combinations of sideways V's and X's, and I's can be employed, including those where the downgradient zone of one treatment center is used as the upgradient zone of a second treatment center, as depicted, for example, in FIG. 2F. Optionally, additional treatment zones can be located at various locations along the upgradient or downgradient zones.

The upgradient and downgradient zones can be formed by any suitable method, many of which are known to those skilled in the art.

The preferred method for installation in soil (i.e., when the subsurface medium is soil), in most instances, is that of removal of the soil from the upgradient or downgradient zone, such as by excavation, and filling the trenches with permeable materials, such as sand, gravel, broken rock, or other high-permeability porous media. Where gravel is employed, it is preferably used in conjunction with a protective geotextile fabric or sand barrier to prevent movement of fines from the soil into the pore spaces of the gravel so that reduction in permeability is prevented.

Where the subsurface medium through which groundwater is to be directed is bedrock, suitable upgradient and downgradient zones can be produced by blasting the bedrock under conditions effective to produce upgradient and downgradient zones of fractured rock. Zones of fractured rock (commonly referred to as "blasted-bedrock zones" or "shatter zones") are preferably formed by subsurface blasting using explosive charges within multiple shotholes drilled several feet apart from one another and oriented in the desired shape of the upgradient or downgradient zone. The shotholes used to fracture the rock are typically spaced along the areas to be blasted in a staggered fashion so as to create a broad zone of shattering. Typically, the explosive charges are separated vertically from each other within each shothole using stemming stone or other suitable material, and the charges are detonated using millisecond delays to reduce vibrations and ground heave to acceptable levels.

Methods for providing the treatment zones are varied and depend on the nature of the subsurface medium. For example, where the pre-existing subsurface medium was soil, the treatment zone can be constructed by removing soil from the treatment-zone area, such as by excavation or drilling a hole or series of holes, and filling the treatment zone with a material having a permeability substantially greater than that of soil, such as sand, gravel, broken rock, zero-valent iron or other metal particles, or combinations of these materials. It should be noted that, as used herein, drilling includes any process by which holes having circular or substantially circular cross-sections are produced, including, for example, augering. Injection wells or piezometers can be installed within the treatment zone's fill material, as appropriate, for subsequent injection or placement of treating agents.

Alternatively, the treatment zone can be constructed by drilling a large hole or series of smaller holes at a contact between upgradient and downgradient zones and installing a well-screen and riser in the drilled hole or in each of the series of drilled holes.

Yet another process for constructing the treatment zone involves removing soil from the treatment-zone area, such as by excavating the soil, and installing permeable, preferably planar walls effective to support the soil surrounding the treatment zone. Suitable permeable walls include those made of permeable sheet piling.

Where the subsurface medium is rock, the treatment zone can be provided by blasting the rock under conditions effective to fracture the rock in the treatment-zone area. Injection wells or piezometers can be installed within the treatment zone's fractured rock, as appropriate, for subsequent injection or placement of treating agents. Alternatively, the treatment zone can be constructed by drilling the rock to produce a hole or a series of holes in the treatment zone. Typically, a single large hole can be drilled, or a series of smaller holes can be used. The drilled holes can be filled with a material having a permeability greater than that of the surrounding rock, such as broken rock, gravel, or zero-valent iron or other metal particles. Alternatively, especially in the case where the surrounding subsurface medium is intact and stable and where the treatment method does not require filling the holes with a permeable material, the drilled holes can be left empty.

The method of the present invention is particularly well suited for the in situ treatment of groundwater containing one or more contaminants. Examples of contaminants which can be treated using the methods of the present invention include: noxious materials; malodorous materials; toxic or hazardous chemical substances, such as dissolved halogenated organic compounds, pesticides, hydrocarbons, heavy metals, cyanides, nitrates, radionuclides, or combinations of these; undesirable physical substances, such as colloids; and dangerous or potentially dangerous biological substances, such as pathogenic bacteria, parasites, or viruses.

Treatment of the subsurface groundwater takes place in situ, below ground, in the treatment zone to which the groundwater is directed by the upgradient zone and directed out of by the downgradient zone. Treatment is carried out by contacting the one or more contaminants with a treating agent under conditions effective to treat at least one of the one or more contaminants present in the subsurface groundwater.

A number of treating agents and technologies can be used to treat groundwater in the treatment zone. The particular technology used for treatment depends on numerous factors, such as the geology, the types and concentrations of the contaminants, the size of the contaminant plumes, the velocity of contaminant migration, and the physical, chemical, biological, legal, regulatory, political, and social constraints that may exist relative to treatment-zone design and implementation.

Contacting the contaminants with the treating agent can be effected by injecting a vapor-, liquid- or solid-phase treating agent directly into the treatment zone. The treating agent can be carried to the treatment zone by any suitable injection vehicle, such as a number of small-diameter wells or piezometers. Under certain site-specific circumstances a number of treating agents can be injected into the treatment zone to treat contaminated groundwater.

For example, oxygenators, such as air, oxygen, hydrogen peroxide, ozone, or solid substances which slowly release oxygen over a period of time, can be used to oxygenate the groundwater and facilitate aerobic biodegradation of the contaminant or contaminants, to the extent to which they can be biodegraded under aerobic conditions. Oxygenators are particularly useful to treat simple, non-chlorinated hydrocarbons and other organic substances amenable to ordinary aerobic biodegradation.

Alternatively, air or oxygen can be used in combination with a co-metabolite (such as methane, propane, or ammonia) to oxygenate the water and to facilitate aerobic biodegradation of the co-metabolite and, at the same time, co-metabolism of the contaminant. This combination is particularly useful to treat halogenated organic compounds. In many instances, use of a co-metabolite requires specific safety precautions (particularly in regard to concentrations being far below the lower explosive limits ("LELs")).

The treating agent can also be an electron acceptor other than oxygen, such as nitrate, particularly in cases where the contaminants are susceptible to biodegradation under anoxic or anaerobic conditions.

Injectable reductants, such as sodium dithionate, starved reductive-iron bacteria, or colloidal iron, can also be used to create conditions conducive to treating contaminated groundwater. In some cases, the reductant converts naturally occurring Fe(III) in minerals to Fe(II) which in turn facilitates degradation of, for example, organic contaminants. In other cases the reductant can reduce inorganic contaminants, such as hexavalent chromium, and facilitate their precipitation. In particular, the use of colloidal iron to treat contaminated water is described in U.S. Pat. No. 5,266,213 to Gillham ("Gillham"), which is hereby incorporated by reference.

Injectable oxidants, such as potassium permanganate or ozone, can also be used to directly attack and break down a variety of contaminants, including halogentated hydrocarbon compounds and other organic contaminants.

As one skilled in the art will note, in some cases, the use of injectable treating agents would require specific safety precautions as well as regulatory approval. As one skilled in the art would also recognize, not all contaminants can be treated with all of the above-described treatment methods.

Alternatively to injecting the treating agent, the treating agent can be placed in the holes or cavities formed in the treatment zone. Frequently this requires the construction of a subsurface cavity, such as a rock cavity or soil excavation, to house the treating agent. The subsurface cavity can be a hole or cavity constructed at the treatment zone, constructed, for example, by the processes described above.

A number of promising treatment processes can be used in a rock cavity or soil excavation. One method, particularly well-suited for the treatment of groundwater containing halogenated organic compounds ("HOCs"), such as perchloroethene ("PCE"), trichloroethene ("TCE"), dichloroethene ("DCE"), and trichloroethane ("TCA"), is described in Gillham, which is hereby incorporated by reference. Briefly, the method involves contacting the HOCs with zero-valent iron or other zero-valent metals placed below the water table. The metals preferably have a high specific surface area, such as when the metal is in the form of filings, particles, or fibers. In the case where zero-valent iron is used, if, some years after the initial metal emplacement, it is discovered that there is loss of permeability caused by chemical precipitation in the upgradient iron, an electromagnet can be used to remove all or some of the iron. The iron can then be reactivated, for example, by acid washing or redistribution, and then re-emplaced. This treatment method can also be effective for groundwater containing excessive concentrations of nitrate.

Treatment of groundwater containing HOCs or volatile organic compounds ("VOCs"), such as benzene, toluene, ethylbenzene, and xylenes, (collectively referred to as "BTEX"), can be effected by sparging the HOCs or VOCs from the groundwater and collecting the sparged vapors in, for example, the vadose zone above the groundwater. This method involves contacting the contaminated groundwater with a gaseous treating agent, such as compressed air or some other innocuous stripping gas. The gaseous treating agent can be delivered down pipes installed to the base of a treatment zone and then forced through microporous bubblers, such as sparging tubes, to create small bubbles. Movement of the bubbles up through the contaminated groundwater in the treatment zone strip out the VOCs, and the VOC-rich stripping gas is then collected, for example, by vapor extraction, and removed for subsequent separation or treatment.

Yet another method for treating contaminated groundwater, particularly well-suited for removing contaminants that tend to sorb onto solids or partition into organic matter, involves contacting the contaminated groundwater with a sorptive material. Suitable sorptive materials include activated carbon, resins, or polymers. Preferably the sorptive material is removable or regenerable.

Numerous other in situ methods can be used to treat the groundwater directed to the treatment zone. These include, for example, metal or radionuclide precipitation by, for example, pH adjustment; electrochemical methods to cause chemical changes to the groundwater contaminants or to precipitate metals, preferably on an electrode; large-scale ultrasonic cavitation; and ultraviolet light treatment, optionally used in conjunction with hydrogen peroxide or ozone treatment The present invention also relates to a method for directing groundwater flowing in a general flow direction through a subsurface medium around a particular subsurface location. The method includes providing an elongate permeable upgradient zone and an elongate permeable downgradient zone, each of which has a major axis parallel to a non-zero component of the general flow direction. The upgradient zone is located hydraulically upgradient from the particular location. That is, the upgradient zone is located so as to intercept groundwater which is flowing toward the particular location or which, in the absence of the upgradient and downgradient zones, would flow into the particular location. The downgradient zone is located hydraulically downgradient from and is in hydraulic communication with the upgradient zone. The downgradient zone is located downgradient from the particular location, so that groundwater flowing out of the downgradient zone does not flow into the particular location. Groundwater is allowed to move from the subsurface medium surrounding the upgradient zone into and through the upgradient zone. The groundwater then moves from the upgradient zone to, through, and out of the downgradient zone into the subsurface medium surrounding the downgradient zone. Each of the upgradient and downgradient zones is situated within the subsurface medium and has a permeability substantially greater than the surrounding subsurface medium's permeability.

Suitable orientations for each of the upgradient and downgradient zones include those described above in connection with the method of treating groundwater.

Figure 3A:
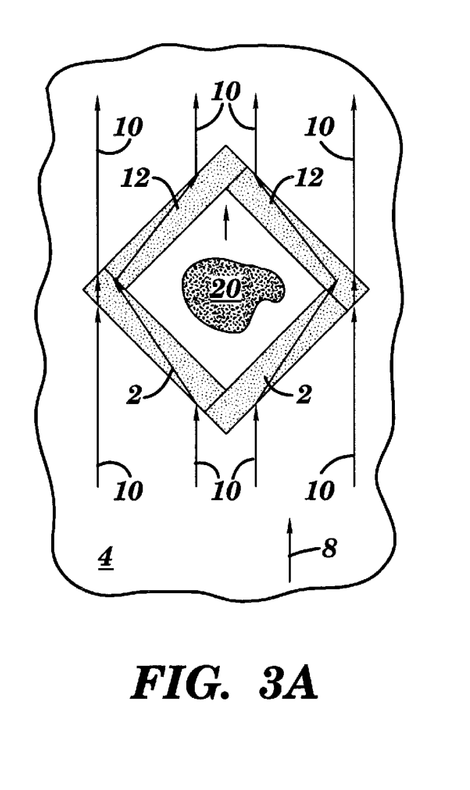
FIGS. 3A–3C are plan views of various upgradient and downgradient zone configurations in accordance with the present invention.
Figure 3B:
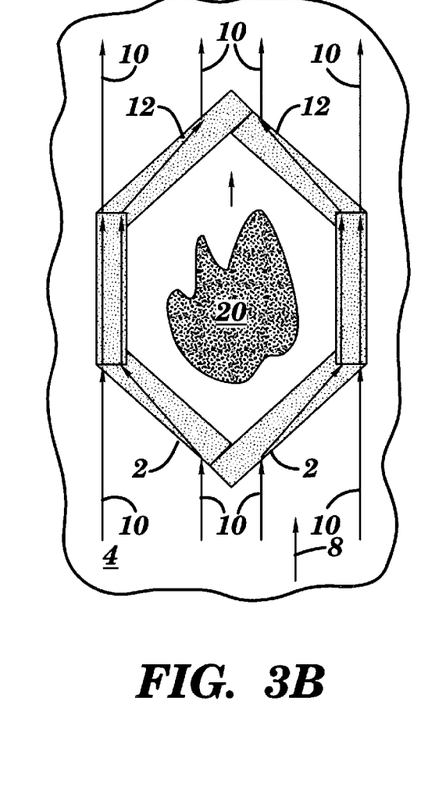
Figure 3C:
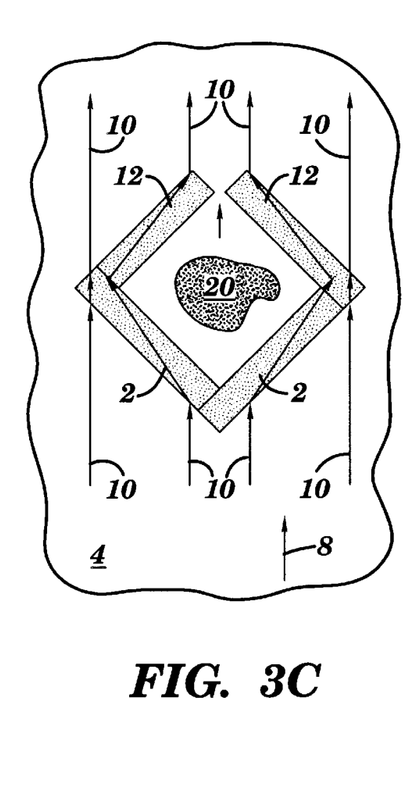

The method of the present invention for directing groundwater around a particular location can also be practiced using several upgradient and downgradient zones. In this embodiment the method further includes providing one or more additional elongated upgradient zones and one or more additional elongated downgradient zones. Each additional upgradient zone and downgradient zone has a permeability which is substantially greater that the permeability of the subsurface medium and each has a major axis parallel to a non-zero component of the flow direction. Preferably, the number of additional upgradient zones is equal to the number of additional downgradient zones so that the total number of upgradient zones is equal to the total number of downgradient zones. The orientation of the additional upgradient and downgradient zones is not critical to the practice of the present invention. However, it is preferred that the downgradient zone and the additional downgradient zones be mirror images of the upgradient zone and the additional upgradient zones reflected in a plane perpendicular to general flow direction and passing through the particular location. Optimally, the total number of upgradient zones is 2, and the total number of downgradient zones is likewise 2. In a more preferred configuration, the downgradient zone and additional downgradient zone are mirror images of the upgradient zone and the additional upgradient zone reflected in a plane perpendicular to ground surface, parallel to the general flow direction, and passing through the particular location. Illustrative configurations suitable for the practice of the present invention are depicted in FIGS. 3A, 3B, and 3C. Flow lines 10 show the path groundwater having a flow direction 8 takes through subsurface medium 4 around particular location 20 under the influence of upgradient zone 2 and downgradient zone 12.

The method of the present invention for directing groundwater around a particular location can be used in a variety of situations. For example, where the groundwater contains a contaminant, and the particular location is relatively free of the contaminant, the method could be used to reduce migration of the contaminated groundwater through the particular location thereby reducing the extent to which the particular location becomes contaminated by the contaminant. Where a particular location contains the contaminant in the subsurface medium and where the groundwater is relatively free of the contaminant, the method of the present invention can be used to reduce the flow of uncontaminated groundwater through the contaminated particular location, thereby reducing the extent to which the uncontaminated groundwater becomes contaminated by the contaminant.

In addition, the groundwater velocity in the particular location would be lowered greatly, by as much as an order of magnitude or more. Reducing flow velocity through a contaminated particular location would have two potential advantages. First, slowing the movement of the impacted groundwater would decrease the rate of contaminant plume growth and development, which could potentially be important since the difficulty and cost of remediating contaminated groundwater is generally an increasing function of plume length, breadth, and depth. Second, decreasing the velocity of the contaminant would increase its residence time within a treatment center installed downgradient from the particular region. This would allow for the deployment of much less remedial agent (such as iron filings for reductive dechlorination, or oxygen injected for oxidative biodegradation) per unit time. The downgradient in situ treatment center can employ conventional treatment processes, such as a funnel-and-gate treatment process (*Remediation Review*, 8(1):6–47 (1995), which is hereby incorporated by reference) (in the case of soil contamination), or the treatment method of the present invention. In either case, decreasing flow velocity through the contaminated particular region would have the advantage of requiring less space in the treatment center, since less treating agent would be required.

Optimization of the methods of the present invention involves a number of factors. These include: the permeability of the upgradient and downgradient zones, shape of the upgradient and downgradient zones, including their width and length, the permeability of the subsurface medium, the orientation of the upgradient and downgradient zones with respect to each other and with respect to the general flow direction of the groundwater, and the size and shape of the treatment zone. The interrelationship of these factors is not fully understood. However, the following is a brief description of how the invention is believed to operate. This brief description in not meant to limit or otherwise effect the scope of the present invention but is only provided to guide optimization of the invention to a particular situation. Accordingly, the scope of the present invention is not to be construed as being limited by the description which follows.

It is believed that the changes in groundwater flow direction at the upgradient and downgradient zones and the convergence of groundwater flows to a treatment center are accomplished through engineered groundwater flow refraction. When groundwater flows out from one medium and into a second medium having a higher permeability, the streamlines in that water tend to be refracted, or reoriented, in different directions than the original streamline directions. The process is similar but not identical to the refraction of light at the junction between two media of differing refractive indices. One difference is that the refraction of light is expressed by a sine law, whereas the refraction of groundwater, under idealized circumstances, is expressed by a tangent law. Refraction in actual groundwater systems, however, depends on three factors, only the first two of which are implied by the tangent law of refraction: (1) the orientation of the contact between the two different media relative to the mean direction of groundwater flow, (2) the relative permeability difference between the two media, and (3) the geometry of the two media and their contact surface. The effects of the last factor on refracted flow must generally be addressed through numerical flow modeling.

Figure 4:
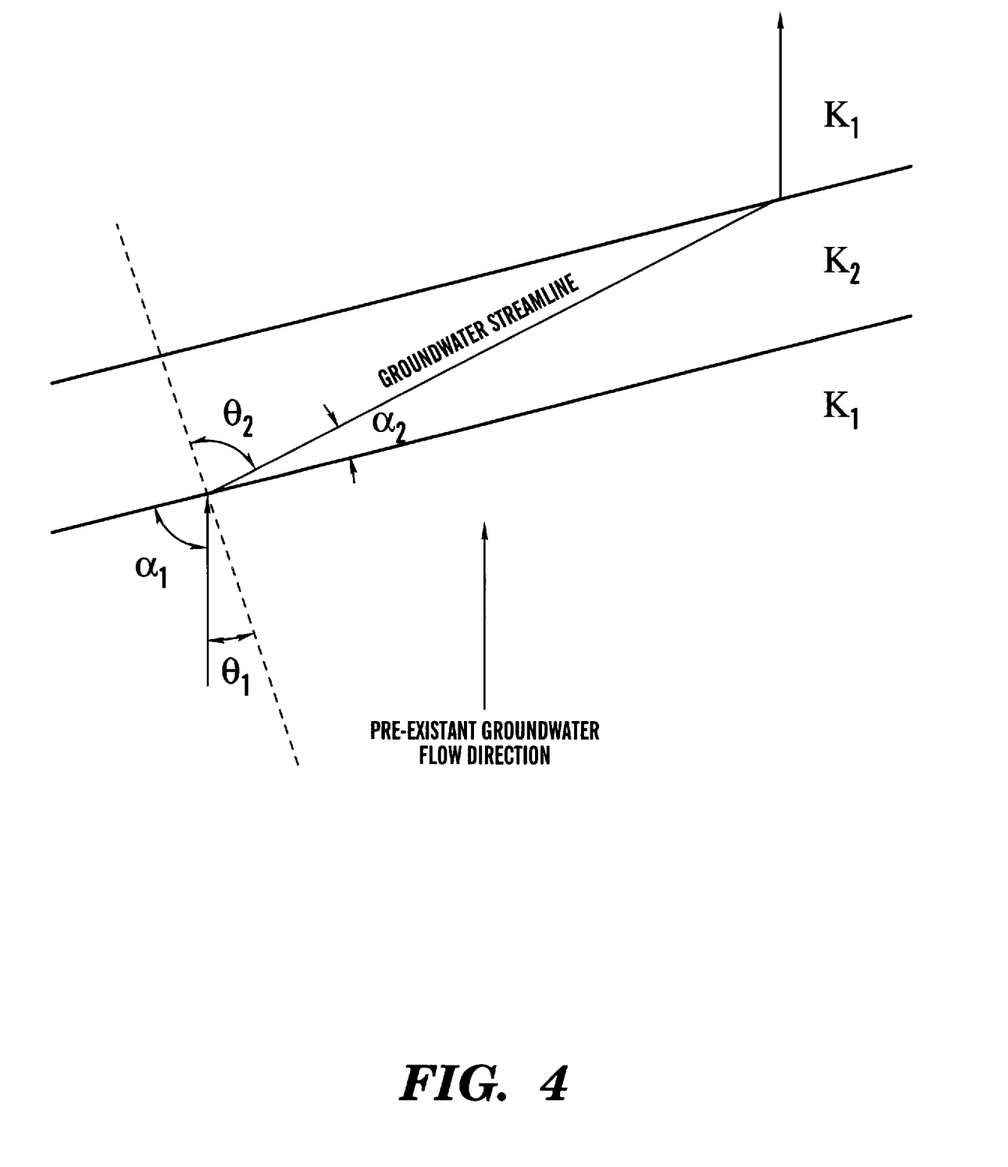
FIG. 4 is a schematic illustrating a streamline of groundwater in an upgradient zone.

The basic concept of flow refraction can be understood in terms of groundwater flow through two subsurface porous media having a vertically planar contact that, in plan view, is oblique, but not perpendicular, to the mean flow direction (See FIG. 4). The permeabilities of the two media differ, and the ratio of the permeabilities is one of the important variables governing flow refraction. This dimensionless ratio has the same numerical value as the ratio of the hydraulic conductivities, where the term "hydraulic conductivity" accounts for fluid parameters affecting flow, such as viscosity and density, as well as for the inherent transmissive capacity of the porous medium (Domenico, which is hereby incorporated by reference). In the common expression of the principles of flow refraction, the ratio of the hydraulic conductivities is used; this practice is followed here.

At the contact between the two media, the streamlines of the groundwater flowing from one medium (with hydraulic conductivity $K_1$) to the contact form an angle $\theta_1$ with the normals (or perpendiculars) to the contact, and the streamlines of the groundwater flowing from the contact into a medium of hydraulic conductivity $K_2$ form an angle $\theta_2$ to these normals, all of which can be expressed according to the tangent law of refraction (Freeze, which is hereby incorporated by reference):

$$\tan(\theta_1)/\tan(\theta_2) = K_1/K_2 \qquad \text{(Eqtn. 1)}$$

In qualitative terms, Equation 1 states that groundwater flowing from a low-permeability medium into a very long, high-permeability medium across an oblique contact will tend to be refracted nearly parallel to that contact if the high-to-low permeability ratio is very high (e.g., >100). If, for instance, a very long, narrow cell of sand were placed 45 degrees oblique to groundwater flow in a silt, where the $K_2/K_1$ ratio was 100, the angle of refraction with respect to the contact normal would be $$\theta_2 = \arctan[\tan(\theta_1)K_2/K_1] = \arctan[\tan(45)100] = 89.4° \qquad \text{(Eqtn. 2)}$$

which means that flow would be nearly parallel to the contact.

If the high-permeability cell were of limited size, however, flow toward the most downgradient end of the cell could not continue to be refracted as it would be along the upgradient portion of the cell, a concept that is not apparent from inspection of Equation 1. This equation assumes a set of two semi-infinite media in which there is no tendency for hydraulic-head buildup at any point. If refraction were to continue all along the length of the finite-length cell, then groundwater would be compressed at the downgradient end of the cell where the high-permeability medium meets the low-permeability medium. Flow in the initial direction of refraction would thus be impeded. The low-permeability "wall" would tend to cause the hydraulic head to build up and stop the refraction process some distance away from the wall. That flow would locally depart from the tangent law of refraction near the end of the cell under conditions in which the high-permeability zone is limited in its spatial extent has been demonstrated as part of this work, based on a USGS MODFLOW groundwater flow representation.

Figure 5:
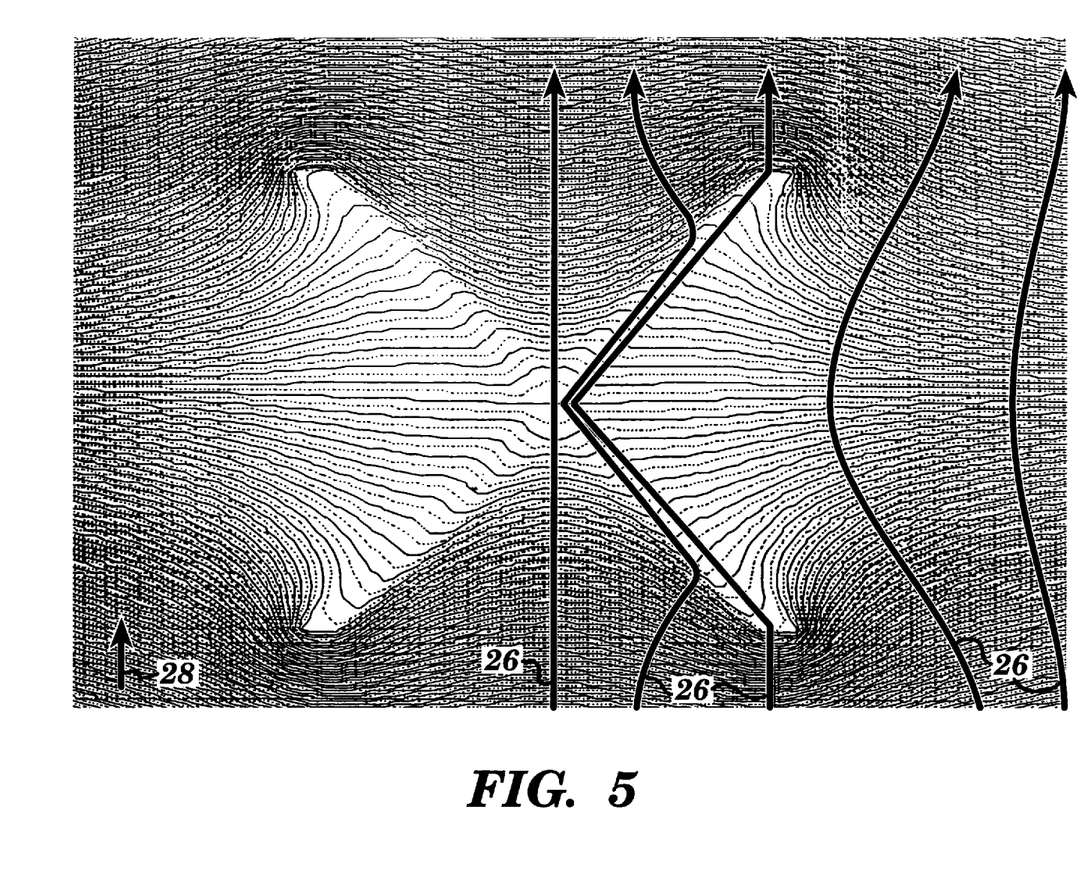
FIG. 5 is a computer-generated contour plot showing lines of equal hydraulic head in an upgradient and downgradient zone configuration in accordance with the present invention.

However, groundwater flow can be made to converge to a locus if there is an associated downgradient region of dispersal having an equal capacity to disperse flow as the upgradient region has to collect flow. This is illustrated conceptually in FIG. 2D, where flow is converging toward a "flow-through" treatment zone through the two upgradient arms of an X-shaped refractive-flow system. The upgradient flow can converge in this zone because the two symmetrical downgradient arms of the refractive-flow system carry groundwater away from the treatment zone as fast as the upgradient arms bring it in. In FIG. 5 (output from a MODFLOW model), the lines of equal hydraulic head, which are perpendicular to local groundwater flow, are illustrated in detail for an X-shaped refractive flow system where the system permeability is 100 times that of the surrounding medium region. Representative groundwater streamlines 26 are also illustrated. FIG. 5 shows that groundwater flow is refracted from initial general flow direction 28 to a direction nearly parallel to the upgradient zones. The groundwater flow is then directed through a permeable treatment zone at the center of the X and into downgradient zones. The groundwater is conveyed out of the downgradient zones to resume its general downgradient course. All groundwater flow contacting the upgradient zone passes through the permeable treatment zone. The X-shaped refractive-flow system has been shown through computer modeling to be highly efficient for directing groundwater through a known, central location, where an in-situ treatment zone can be installed.

Figure 6:
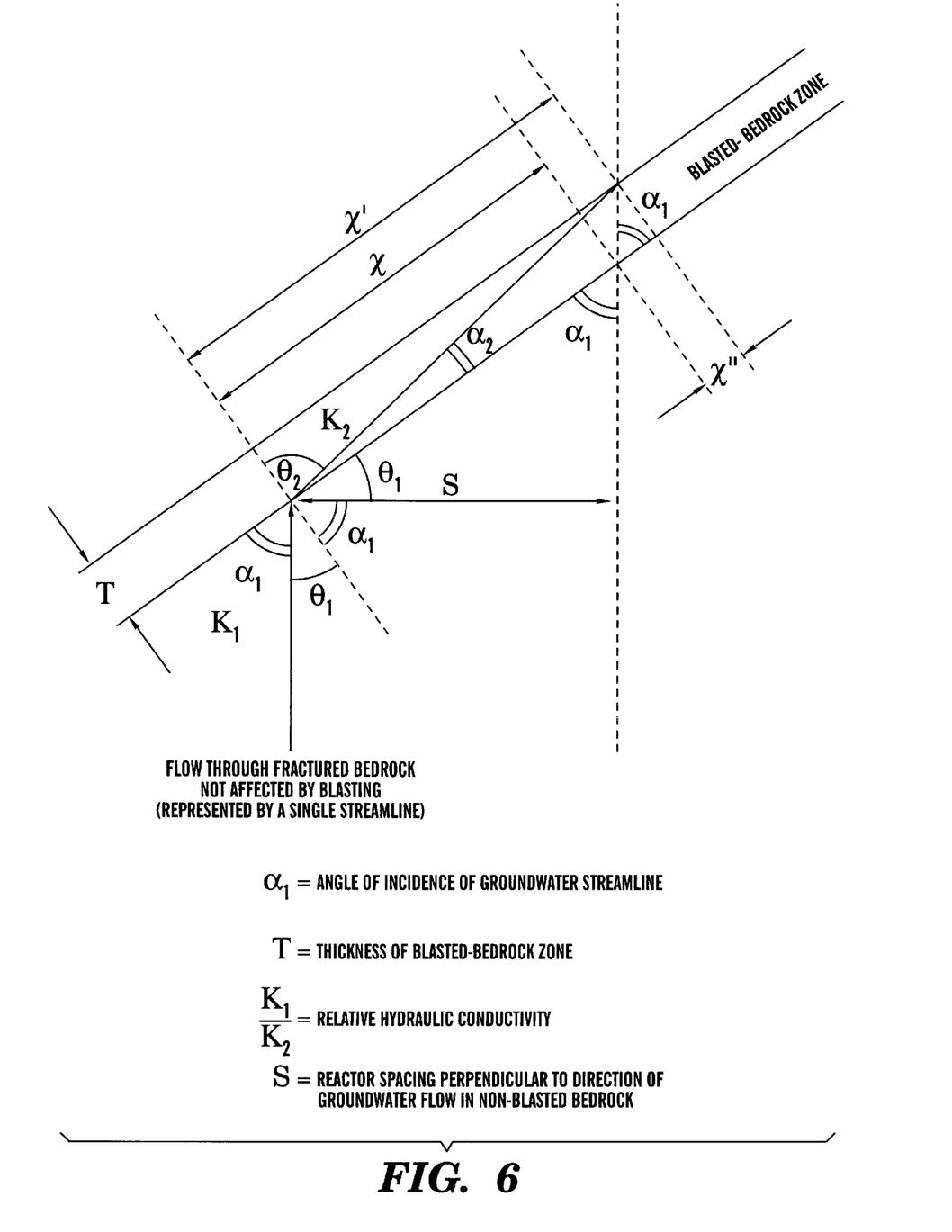
FIG. 6 is a schematic illustrating a streamline of groundwater in an upgradient zone and the transverse spacing of optional additional treatment zones in accordance with the present invention.
Figure 7:
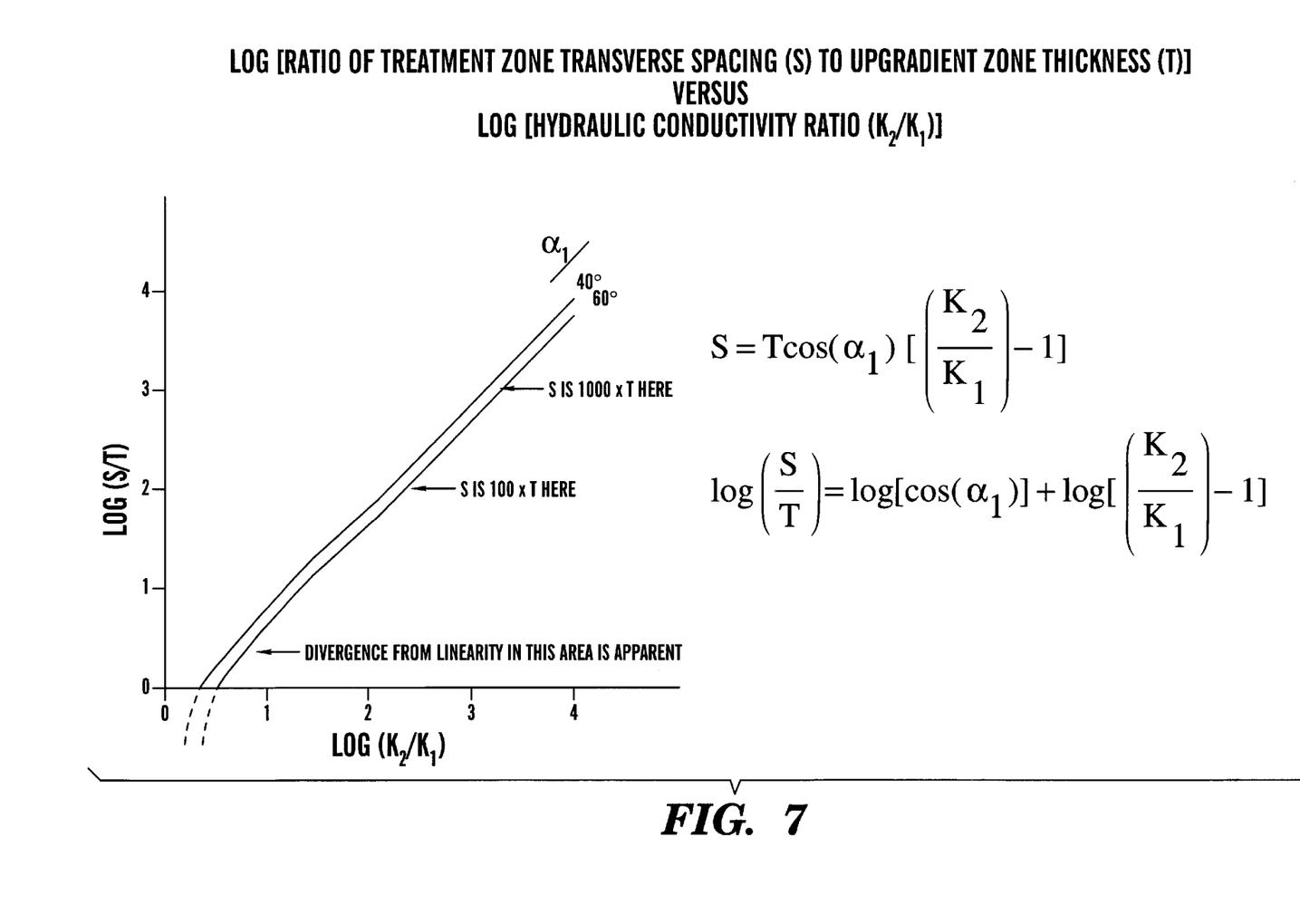
FIG. 7 is a graph showing the relationship of treatment-zone transverse spacing (S), hydraulic conductivity ratio ($K_2/K_1$), and upgradient zone thickness (T).

If a need were to exist for multiple treatment centers to be placed along the upgradient arms of a refractive-flow system, it would be necessary to be able to estimate the spacing between the treatment centers. This spacing, interpreted in the equations as being perpendicular to the mean direction of groundwater flow, can be calculated with reference to FIG. 6. S, the spacing between treatment zones, is equal to T, the thickness of the high-permeability subsurface conduit (i.e. the thickness of the upgradient zones), multiplied by $\cos(\alpha_1)$, the cosine of the angle between the major axis of the upgradient zone and the the mean (i.e., general) groundwater flow direction, multiplied by the term $[(K_2/K_1)-1]$.

$$S=T[\cos(\alpha_1)][(K_2/K_1)-1] \quad \text{(Eqtn. 3)}$$

FIG. 6 shows how the ratio (S/T) varies with $(K_2/K_1)$ for different representative values of $\alpha_1$. The values of T and $K_2$ can be estimated from prior experience and, if necessary, can be confirmed, for example, by exploratory drilling and testing in the field after several shotholes have been blasted. Adjustments in blasting methods can be made in the field as necessary to achieve appropriate values for T and $K_2$. The calculations should give reasonable estimates of (S/T) for refractive-flow systems with proper downgradient flow dispersal. A reasonable factor of safety should be applied in the design to account for subsurface heterogeneities and other unknowns.

Although the invention has been described for the purpose of illustration, it is understood that such detail is solely for that purpose and variations can be made therein by those skilled in the art without departing from the spirit and scope of the invention.

What is claimed:

1. A method for treating groundwater flowing in a general flow direction through a subsurface medium comprising:

providing an elongate permeable upgradient zone located hydraulically upgradient from and in hydraulic communication with a permeable subsurface treatment zone;

providing an elongate permeable downgradient zone located hydraulically downgradient from and in hydraulic communication with the permeable subsurface treatment zone; and allowing groundwater to move from the subsurface medium surrounding the upgradient zone into and through the upgradient zone to, through, and out of the treatment zone and into, through, and out of the downgradient zone into the subsurface medium surrounding the downgradient zone; and treating the groundwater in the treatment zone, wherein each of the upgradient zone, downgradient zone, and treatment zone is situated within the subsurface medium and has a permeability substantially greater than the surrounding subsurface medium's permeability.

2. A method according to claim 1, wherein the subsurface medium is soil.

3. A method according to claim 2, wherein the upgradient zone and the downgradient zone each independently comprises a material selected from the group consisting of sand, gravel, and combinations thereof.

4. A method according to claim 3, wherein said providing the upgradient zone and said providing the downgradient zone comprises:

removing soil from the upgradient zone and the downgradient zone and filling the upgradient zone and the downgradient zone with a material selected from the group consisting of sand, gravel, broken rock, and combinations thereof.

5. A method according to claim 2, wherein the treatment zone is provided by a process comprising:

removing soil from the treatment zone and filling the treatment zone with a material selected from the group consisting of sand, gravel, broken rock, and combinations thereof.

6. A method according to claim 5, wherein the removing soil from the treatment zone comprises:

excavating soil from the treatment zone.

7. A method according to claim 5, wherein the removing soil from the treatment zone comprises:

drilling a hole or a series of holes in the treatment zone.

8. A method according to claim 1, wherein the subsurface medium is rock.

9. A method according to claim 8, wherein each of the upgradient zone and the downgradient zone comprises fractured rock.

10. A method according to claim 9, wherein said providing the upgradient zone and said providing the downgradient zone comprises:

blasting the rock under conditions effective to fracture the rock in the upgradient zone and the downgradient zone.

11. A method according to claim 8, wherein the treatment zone is produced by a process comprising:

blasting the rock under conditions effective to fracture the rock in the treatment zone.

12. A method according to claim 8, wherein the treatment zone is produced by a process comprising:

drilling the rock under conditions effective to produce a hole or a series of holes in the treatment zone.

13. A method according to claim 1, wherein the groundwater comprises a contaminant.

14. A method according to claim 13, wherein the contaminant is selected from the group consisting of toxic materials, hazardous materials, pathogens, malodorous materials, noxious materials, and combinations thereof.

15. A method according to claim 1, wherein said treating comprises:

contacting, within the treatment zone, the contaminant with a treating agent under conditions effective to treat the contaminant.

16. A method according to claim 15, wherein the contacting comprises:

injecting the treating agent into the groundwater within the treatment zone.

17. A method according to claim 15, wherein the contacting comprises:

emplacing the treating agent into the groundwater within the treatment zone.

18. A method according to claim 15, wherein the contacting comprises:
emplacing a material capable of releasing the treating agent into the groundwater in the treatment zone and
allowing or causing release of the treating agent into the groundwater in the treatment zone.

19. A method according to claim 15, wherein the treating agent is selected from the group consisting of air, oxygen, oxidants other than oxygen, co-metabolites, nutrients other than co-metabolites, electron acceptors, zero-valent iron, reductants other than zero-valent iron, acids, alakalies, surfactants, sorbents, heat energy, light energy, acoustic energy, and combinations thereof.

20. A method according to claim 1, wherein the upgradient zone has a major axis, wherein the general flow direction forms an angle of $\alpha$ with respect to the upgradient zone's major axis, and wherein $\alpha$ is from about 30° to about 60°.

21. A method according to claim 20, wherein the downgradient zone has a major axis, wherein the general flow direction forms an angle of 180-$\alpha$° with respect to the downgradient zone's major axis, and wherein an angle of 180-2$\alpha$° exists between the downgradient zone's major axis and the upgradient zone's major axis.

22. A method according to claim 1, wherein the upgradient zone has a substantially uniform width, the downgradient zone has a substantially uniform width, and the widths and lengths of the upgradient and downgradient zones are substantially the same.

23. A method according to claim 1, wherein the downgradient zone is a mirror image of the upgradient zone reflected in a plane perpendicular to general flow direction and passing through the treatment zone.

24. A method according to claim 1, further comprising:
providing one or more additional elongate permeable upgradient zones, each located hydraulically upgradient from and in hydraulic communication with the treatment zone and
providing one or more additional elongate permeable downgradient zones, each located hydraulically downgradient from and in hydraulic communication with the treatment zone, wherein each of the additional upgradient zones and each of the additional downgradient zones is situated within the subsurface medium and has a permeability substantially greater than the surrounding subsurface medium's permeability.

25. A method according to claim 24, wherein the number of additional upgradient zones is equal to the number of additional downgradient zones.

26. A method according to claim 25, wherein the downgradient zone and the additional downgradient zones are mirror images of the upgradient zone and the additional upgradient zones, reflected in a plane perpendicular to general flow direction and passing through the treatment zone.

27. A method according to claim 26, wherein the number of additional upgradient zones is one and the number of additional downgradient zones is one and wherein the downgradient zone and additional downgradient zone are mirror images of the upgradient zone and the additional upgradient zone, reflected in a plane perpendicular to ground surface, parallel to the general flow direction, and passing through the treatment zone.

* * * * *